May 24, 1927.
E. WILSON
1,629,757
THERMOSTATIC CONTROL DEVICE
Filed Dec. 17, 1924
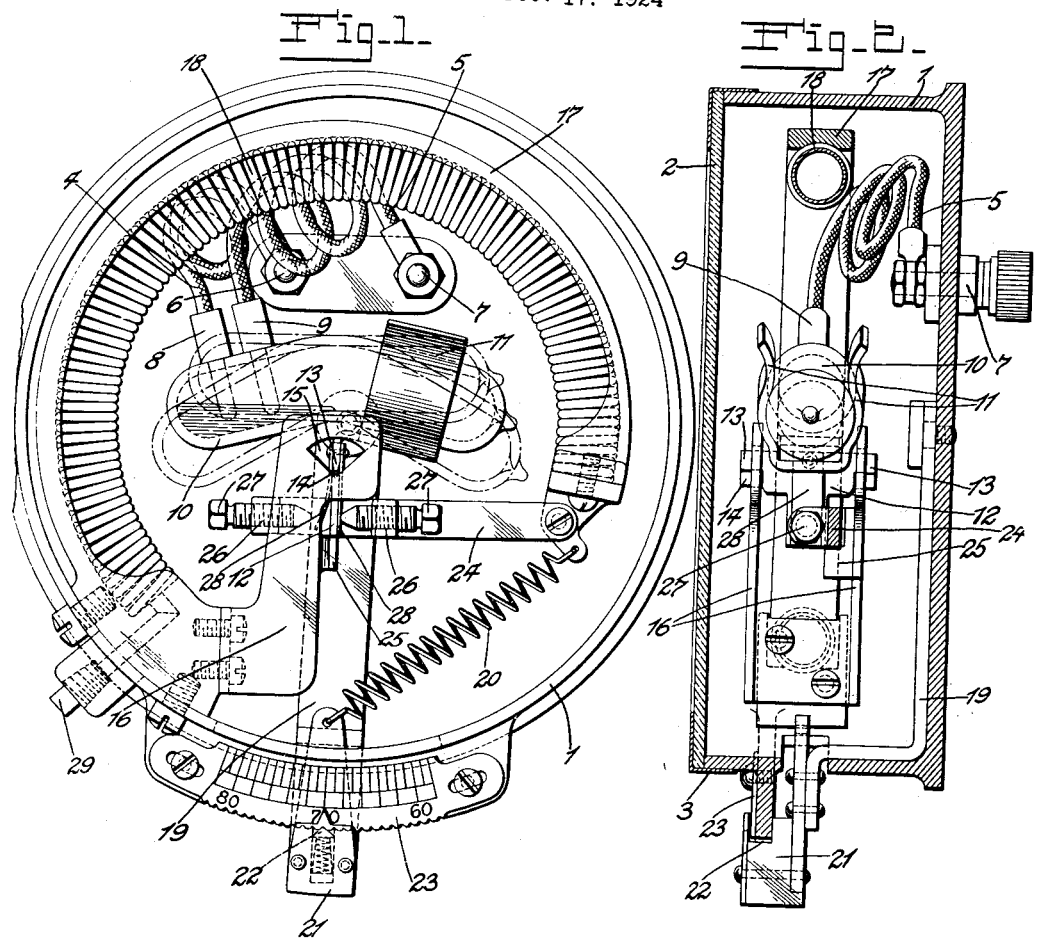
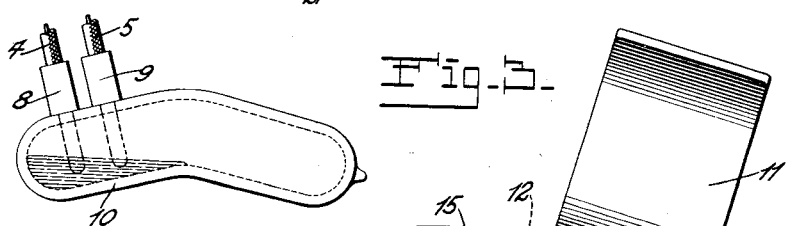
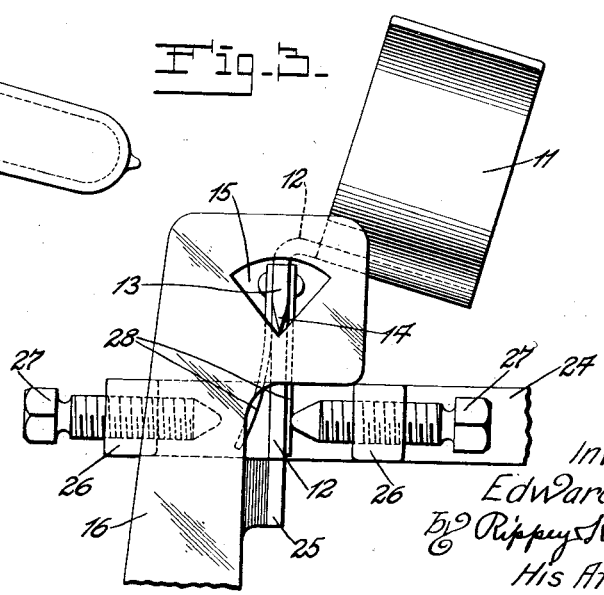
Inventor:
Edward Wilson,
by Rippey Kingsland,
His Attorneys.

Patented May 24, 1927.

1,629,757

UNITED STATES PATENT OFFICE.

EDWARD WILSON, OF ST. LOUIS, MISSOURI, ASSIGNOR TO THE NATIONAL PUMP & COMPRESSOR COMPANY, OF ST. LOUIS, MISSOURI, A CORPORATION OF DELAWARE.

THERMOSTATIC CONTROL DEVICE.

Application filed December 17, 1924. Serial No. 756,486.

This invention relates to thermostatic control devices for use in controlling the operation of electric and other machines.

An object of the invention is to provide an improved thermostatic controlling device including a switch of the mercury type, means for supporting the switch in a manner in which it is movable to and from open and closed positions, and an actuator of an improved quick-acting type for operating the switch as an incident to the variation of the temperature beyond predetermined desired limits.

Another object of the invention is to provide an improved thermostatic controlling device comprising a switch and an actuator therefor possessing the novel characteristics and advantageous mode of operation hereinafter disclosed.

Another object of the invention is to provide a device of the character mentioned and including means for regulating and varying the relationship of the parts so that the switch will be operated at selected variable temperatures.

Other objects will appear from the following description, reference being made to the drawing, in which—

Fig. 1 is a front elevation of the device with the cover plate thereof removed.

Fig. 2 is a vertical sectional view.

Fig. 3 is an enlarged detailed view of important features of the invention.

Fig. 4 is a side elevation of the switch member detached from the other parts.

In the embodiment of the invention shown the operative devices are confined within an enclosing casing 1 having an open end closed by a glass plate 2 held in place by a ring 3.

The electric circuit wires 4 and 5 lead from binding posts 6 and 7 and have their terminals 8 and 9 extending into an angular or curved glass container 10 near one end thereof. The glass container 10 and its mercury contents for the purpose of opening and closing the electric circuit are of familiar commercial type and do not require extended description. However, their association with and relationship to the remaining subject matter of the invention are new and useful. For the present purposes it is sufficient to mention that when the mercury contents of the container 10 are at the end into which the terminals 8 and 9 extend the electric circuit is closed; and when said contents are at the opposite end of said container the circuit is open. The present invention comprises means for supporting the container so that it will be operated under the influence of a thermostatic actuator to cause the mercury contents to flow from one end of the container 10 to the other end thereof to open and to close the circuit.

The container 10 is supported in a clip comprising a pair of spring arms 11 embracing the container between them, an extension 12 from said clip having laterally extended arms 13 terminating at their under edges in attenuated or knife edges 14. The attenuated edges 14 of the arms 13 pivot in the lower corners of bearing openings 15 in the two arms 16 of a bracket. An arcuate resilient arm 17 has one end attached to the wall of the casing 1 and supports the bracket of which the arms 16 are a part. A corrugated tube 18, containing a quantity of volatile liquid and its vapor, the pressure of which changes with the change of temperature, is held in connection with the arm 17 curving in conformity with the arm and constitutes the actuator tending to straighten the arm under the influence of heat. The corrugations of the tube 18 may be either spiral as shown, or of other form. The free end of the arm 17 is connected with a thermostatic regulating member 19 by a coil spring 20. The member 19 has a manually engageable part 21 in connection therewith and accessible from the outside, so that said member 19 may be moved to different adjusted positions to control the operation of the arm 17 by the actuator 18 at selected degrees of temperature. A detent 22 supported by the part 21 has latching engagement with the teeth of a segmental plate 23 having degrees of temperature indicated thereon to guide the user of the device in setting it so that the device will operate the switch in conformity with the requirements. A link 24 has its outer end pivoted to the free end of the arm 17 and its inner end supported from one of the bracket arms 16. A pair of ears 26 in connection with the link 24 have threaded holes therethrough in each of which a regulating screw 27 is operatively mounted. The arm 12 extends between the ends of the screws 27 and leaf springs 28 have their upper ends attached to the arm 12 and their lower ends diverging at opposite sides of said arm. As the temperature affects the actuator 18 the link 24 is operated causing one or the other of the abutment screws 27 to contact with the cooperative spring 28 and move the switch device 10 to position to open or to close the circuit, depending upon the direction of movement of the link 24.

The abutment screws 27 may be adjusted to increase or reduce extent of movement of the actuator required to operate the switch. The abutment screws 27 bear a certain relationship to the thermostatic scale on the plate 23 and an adjustment once obtained need never be varied unless it is desired to vary the conditions under which the device will operate.

The mercury switch element may obviously be mounted with the electric terminal contact members 8 and 9 at either side of the pivot, thus providing that the circuit will be closed by increase of temperature in the mounting shown (Fig. 1); and providing that the circuit will be closed with decrease of temperature by reversing the switch to a position in which the terminal members 8 and 9 are at the opposite side of the pivot, and vice versa.

The actuator 18 may also be controlled by variation in temperature applied to the inside of the actuator through an inlet passage 29.

It is clear that my invention obtains all of its intended objects and purposes in an efficient and satisfactory manner, may be economically manufactured and sold and is not subject to much wear when in use.

What I claim and desire to secure by Letters Patent is:

1. A thermostatic control device comprising an element to be actuated, a curved resilient arm, connections from said arm for actuating said element, and a corrugated tubular actuator mounted within the curvature of and attached to said arm.

2. A thermostatic control device comprising an element to be actuated, a curved arm, connections for actuating said element by said arm, a corrugated tubular actuator curving with and attached to said arm, and a pipe opening into one end of said actuator.

3. A thermostatic control device comprising an element to be actuated, a curved arm tapering from maximum thickness at one end toward the other end, a tubular actuator mounted within the curvature of and attached to said arm and being responsive to variation in temperature, and connections for actuating said element by said arm.

4. A thermostatic control device comprising an element to be actuated, a curved arm tapering from maximum thickness at one end toward the other end, a tubular actuator mounted within the curvature of and attached to said arm and being responsive to variation in temperature, connections for actuating said element by said arm, and means for moving said arm to its starting point from which it is moved by said actuator.

5. A thermostatic control device comprising an element to be actuated, a curved arm tapering from maximum thickness at one end toward the other end, a tubular actuator mounted within the curvature of and attached to said arm and being responsive to variation in temperature, connections for actuating said element by said arm, and a device settable to increase or reduce the amount of energy by which said element will be moved by said arm and said actuator.

6. A thermostatic control device comprising a curved arm of increasing thickness from a point near one end to a point near the opposite end, a corrugated tubular actuator responsive to variation in temperature mounted within the curvature of and engaging said arm, an inlet passage opening into one end of said actuator, and a spring resisting movement of said arm by said actuator.

7. A thermostatic control device comprising a curved arm, a corrugated tubular actuator mounted within the curvature of and attached to said arm, an element to be actuated, means for actuating said element by said arm, and means for controlling said arm whereby said arm will be operated at a predetermined temperature.

8. A thermostatic control device comprising a curved arm, a corrugated tubular actuator mounted within the curvature of and attached to said arm, an element to be actuated, means for actuating said element by said arm, and means for controlling and indicating the temperature at which said arm will be actuated by said actuator.

EDWARD WILSON.